Patented Feb. 16, 1926.

1,572,909

UNITED STATES PATENT OFFICE.

UDO von PORTEN, OF ST. LOUIS, MISSOURI.

ARTIFICIAL FUEL.

No Drawing. Application filed February 24, 1925. Serial No. 11,151.

*To all whom it may concern:*

Be it known that I, UDO VON PORTEN, a citizen of the United States, residing at St. Louis, in the State of Missouri, have invented certain new and useful Improvements in Artificial Fuel, of which the following is a specification.

My invention consists in the production of an artificial fuel as a new composition of matter and comprises the novel features more fully set forth in the specification and pointed out in the claims.

The principal object of the invention is to produce an artificial fuel that may be cheaply manufactured and that possesses a large number of heat units and also utilizes as its principal ingredient refuse organic matter such as manure, garbage and other like substances that are not now put to beneficial use.

In preparing this new fuel I utilize a large percentage of waste animal or vegetable matter and mix after having expelled the moisture therefrom this with a suitable hydro-carbon distillate and a combustible binder, which mixture, after being pressed into blocks or bricks, is dried, when the fuel is ready for use. The ingredients of my improved fuel that are preferably used together with the percentages are as follows:

| | Per cent. |
|---|---|
| Waste animal or vegetable matter (manure or garbage) | 75 |
| Tar oil | 15 |
| Coal oil | 2 |
| Common clay | 5 |
| Coal tar pitch | 3 |

The method of preparing and combining these ingredients to form the finished fuel is as follows:

The waste animal or vegetable matter is first completely dried and thereafter finally ground or pulverized. To the preferred amount of this pulverized refuse is added the tar oil and pitch which constitute a combustible binder, and the coal oil which gives the finished fuel increased combustible properties, this mixture then being worked into a paste or batter after which may be added the common clay or other earth product to serve as a diluent. If this diluent is not added the resulting fuel would be too rapidly consumed and would not prove as economical as it does with the proper amount of diluent. In addition to retarding the combustion of the fuel the diluent also serves as a heat retainer and furnishes an ash that retains its heat for a considerable time after the combustible ingredients of the fuel have been consumed. The batter that has been prepared from the above mixture of ingredients is compressed into blocks or bricks and is then dried in this shape preferably in the open air although kiln drying may be resorted to if desired.

It should be understood that the exact percentages set out above are not absolutely essential as a desirable fuel may be produced even though these percentages are departed from within reasonable limits. It is also possible to produce a satisfactory fuel without tar oil and pitch provided another ingredient having similar properties, that is, such properties as will assist in the combustion of the fuel and also serve as a binder for the mixture, is used. The coal oil may also be replaced by an equivalent hydrocarbon distillate with satisfactory results.

I have found in practice that a fuel produced as above explained possesses a greater number of heat units than the ordinary bituminous coal and when thoroughly compressed is also considerably cleaner than ordinary bituminous coal. These properties, in addition to the ease of handling the finished bricks, render this fuel very desirable for ordinary household consumption.

Having described my invention, I claim:—

1. An artificial fuel consisting of dried organic refuse, a hydrocarbon distillate, a combustible binder, and a non-combustible diluent in substantially the following proportions by weight:

|  | Per cent. |
|---|---|
| Animal or vegetable refuse | 75 |
| Hydrocarbon distillate | 2 |
| Combustible binder | 18 |
| Common clay | 5 |
| Total | 100 |

2. An artificial fuel consisting of a mixture of the following substances compressed into bricks and dried:

|  | Per cent by weight. |
|---|---|
| Animal or vegetable refuse (dried) | 75 |
| Tar oil | 15 |
| Coal oil | 2 |
| Pitch | 3 |
| Common clay | 5 |
| Total | 100 |

In testimony whereof I hereunto affix my signature.

UDO von PORTEN.